(12) United States Patent  
Kamada

(10) Patent No.: US 9,207,381 B2  
(45) Date of Patent: Dec. 8, 2015

(54) BACKLIGHT UNIT AND LIQUID CRYSTAL DISPLAY APPARATUS

(75) Inventor: Kentaro Kamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 112 days.

(21) Appl. No.: 14/125,247

(22) PCT Filed: Jun. 8, 2012

(86) PCT No.: PCT/JP2012/064753  
§ 371 (c)(1),  
(2), (4) Date: Dec. 10, 2013

(87) PCT Pub. No.: WO2012/173048  
PCT Pub. Date: Dec. 20, 2012

(65) Prior Publication Data  
US 2014/0132888 A1      May 15, 2014

(30) Foreign Application Priority Data

Jun. 14, 2011   (JP) .................... 2011-132556

(51) Int. Cl.  
*G02F 1/1335*   (2006.01)  
*F21V 8/00*   (2006.01)

(52) U.S. Cl.  
CPC ........ *G02B 6/0031* (2013.01); *G02F 1/133603* (2013.01); *G02F 1/133604* (2013.01); *G02F 1/133605* (2013.01); *G02B 6/0055* (2013.01); *G02B 6/0091* (2013.01); *G02F 2001/133607* (2013.01)

(58) Field of Classification Search  
CPC .............. G02F 1/133603; G02F 2001/133607; G02F 1/133605; G02F 1/133604  
See application file for complete search history.

(56) References Cited

U.S. PATENT DOCUMENTS

2006/0175626 A1   8/2006 Wall, Jr.  
2011/0292318 A1*  12/2011 Nakamoto et al. ............. 349/62

FOREIGN PATENT DOCUMENTS

| JP | 10-247412 A | 9/1998 |
| JP | 2006-222430 A | 8/2006 |
| JP | 2007-128748 A | 5/2007 |
| JP | 2008-71696 A | 3/2008 |

* cited by examiner

*Primary Examiner* — Phu Vu  
(74) *Attorney, Agent, or Firm* — Chen Yoshimura LLP

(57) ABSTRACT

In order to prevent unevenness in planar light and reduce power consumption, a backlight unit A that emits planar light towards a front side thereof has a light-shielding part 500 provided on a package 50 at least on a front side of the backlight unit. The package 50 has an LED module 5 that surrounds an LED chip 51 that is a light source, and the light-shielding part 500 protrudes towards a light receiving face 22 of a light guide plate 2.

8 Claims, 5 Drawing Sheets

BACKLIGHT UNIT AND LIQUID CRYSTAL DISPLAY APPARATUS

TECHNICAL FIELD

The present invention relates to an edge-lit backlight unit and a liquid crystal display device provided with the same.

BACKGROUND ART

A liquid crystal display device has a liquid crystal panel unit and a backlight unit that is arranged on the rear surface of the liquid crystal panel unit. The liquid crystal panel unit adjusts the transmittance of light (the amount transmitted) from the backlight unit to display images on the front surface of the liquid crystal panel unit.

These backlight units are largely divided into two types. One type is a light guide plate type (an edge-lit type) in which light enters from a side face of the light guide plate, and the other type is a direct-lit type in which light sources are arranged on the rear surface of the liquid crystal module.

Conventionally, an edge-lit backlight unit had a structure in which light was incident on a side face of the light guide plate, which made it difficult to emit a large planar light with a uniform brightness distribution. This edge-lit backlight unit was frequently used in small liquid crystal display devices, such as for the monitors of notebook PCs and gaming systems. Due to the recent rise in demand for liquid crystal display devices to be thinner and smaller along with improvement in light guide plate precision, and because of an increase in brightness of the LEDs used as light sources and the like, it has become possible to emit large planar light with a uniform brightness distribution, and thus, the edge-lit backlight unit has been increasingly used in large liquid crystal display devices, such as in large-sized televisions.

The edge-lit backlight unit will be explained below. The edge-lit backlight unit includes: a light source unit in which a plurality of LEDs are arranged in parallel; a light guide plate that receives light emitted from the light source unit on a light receiving face on a side face of the light guide plate, the light guide plate emitting planar light from a light exiting surface that is one main surface of the light guide plate; optical sheets arranged adjacent to the light exiting surface of the light guide plate; and a reflective sheet arranged adjacent to the surface of the light guide plate that is opposite to the light exiting surface. These members are arranged inside a backlight chassis.

In such an edge-lit backlight unit, it is preferable for the light source unit to be as close to the light guide plate as possible in order to reduce unevenness in light emitted from the light source unit. The light guide plate and light source unit, however, are arranged with a gap therebetween to prevent the light guide plate and light source unit from coming into contact with each other when the light guide plate expands due to heat.

Meanwhile, the light emitted from the LEDs is diffused light, and this light emitted from the LEDs may leak from the gap, without entering the light guide plate, and then be irregularly reflected by the optical sheets, reflective sheet, and the like, thereby being emitted to outside of the backlight unit (light leakage). If this light leakage occurs, a line with a high brightness (hereinafter, a bright line) will occur in the vicinity of the light source unit that emits the planar light from the backlight unit. If this bright line occurs, the uniformity of brightness of the planar light will be lost, and the display quality of images displayed by the liquid crystal display device will be reduced.

This light leakage often occurs due to the size of the LEDs, the thickness of the light guide plate, and the gap between the light source unit and the light guide plate. Recent backlight units have a tendency for the light guide plate to be smaller (thinner) in order to be lighter and cheaper, but it is difficult to make the LEDs smaller to the same degree as the light guide plate because the light emitting efficiency of the LEDs would be reduced. As such, if the light guide plate becomes thinner relative to the size of the LEDs, then the diffused light from the LEDs is more susceptible to straying from the light receiving face of the light guide plate and leaking, even if the gap between the light source unit and the light guide plate remains the same.

In Japanese Patent Application Laid-Open Publication No. 2007-128748, a backlight configuration is proposed in which a reflective plate is arranged above the gap between the light source unit and light guide plate, and a reflective sheet with diffuse reflection characteristics is bonded to a surface of the reflective plate near the light guide plate. In this backlight, light that is emitted by the LEDs but not incident on the light guide plate is reflected by the reflective sheet bonded to the reflective plate and then incident on the light guide plate. This suppresses the occurrence of light leakage and uneven brightness in the planar light caused by the light leakage.

In Japanese Patent Application Laid-Open Publication No. 2008-71696, a backlight is proposed in which the light emitting part of the LEDs is arranged at a slant and sealed with a resin in order for light to enter a thin light guide plate. By providing a reflective member that reflects light emitted from the sealing resin, the light reflected by the reflective member enters the light guide plate. With this configuration, the outer diameter of the LEDs can be made smaller, and the backlight can be made thinner.

In Japanese Patent Application Laid-Open Publication No. 2006-222430, a configuration is proposed in which a beam shutter is formed that shields regions of an LED sub-mount or circuit substrate where light leakage is undesirable from being irradiated with light. A configuration is also disclosed in which this beam shutter has reflective characteristics. With this configuration, light emitted from the LEDs is blocked by the beam shutter, and thus, light leakage of the backlight can be suppressed.

RELATED ART DOCUMENTS

Patent Documents

Patent Document 1: Japanese Patent Application Laid-Open Publication No. 2007-128748
Patent Document 2: Japanese Patent Application Laid-Open Publication No. 2008-71696
Patent Document 3: Japanese Patent Application Laid-Open Publication No. 2006-222430

SUMMARY OF THE INVENTION

Problems to be Solved by the Invention

The backlight in Japanese Patent Application Laid-Open Publication No. 2007-128748 is difficult to make smaller because a space for arranging the reflective plate must be secured in addition to space for the conventional backlight. A method is possible in which the reflective sheet is bonded to a portion of the backlight, but there may be no place to bond the reflective sheet, which makes this method difficult to manage.

The backlight in Japanese Patent Application Laid-Open Publication No. 2008-71696 needs to have LEDs sealed with a resin with high precision, which adds labor and time to the manufacturing of the backlight. The structure of this backlight is also complicated and susceptible to variation in performance caused by deviations at the time of manufacturing.

The backlight in Japanese Patent Application Laid-Open Publication No. 2006-222430 has a beam shutter formed on the sub-mount or circuit substrate, and thus, the semiconductor manufacturing process becomes complicated, and labor and time are added to manufacturing.

The present invention aims at providing a backlight unit that has a simple structure; that can be manufactured with ease; and that can suppress light leakage in which light emitted from a light source leaks from a light guide plate.

Means for Solving the Problems

In order to achieve the above-mentioned aims, the present invention includes a light source unit having a plurality of light emitting diode modules arranged in a row; and a light guide plate that has a light receiving face that is a side face where light from the light source unit enters, and that emits a planar light from a light exiting surface that is a main surface so as to emit the planar light from a front side of the backlight unit, wherein each of the light emitting diode modules is provided with a light-shielding part on a package that surrounds a light emitting diode chip, which is a light source, the light-shielding part being on at least a front side of the backlight unit, the light-shielding part protruding towards the light receiving face of the light guide plate.

With this configuration, after the light is emitted from the LED chip, the light that is incident on the backlight unit is shielded by the light-shielding part, and thus, it is difficult for the light to leak from the gap between the light source unit and light guide plate towards the front of the backlight unit (it is hard for light leakage to occur). This makes it possible to suppress unevenness of brightness in planar light emitted from the backlight unit that is caused by light leakage.

In the above-mentioned configuration, a sealing part that seals the light emitting diode chip with a resin may be formed in the package, and a tip of the light-shielding part may be closer to the light guide plate than the sealing part.

In the above-mentioned configuration, a surface of the light-shielding part near the light emitting diode chip may reflect light.

In the above-mentioned configuration, the light-shielding part may have a shape in which a central portion of the light-shielding part is closest to the light guide plate.

In the above-mentioned configuration, the light-shielding part may have a triangular shape.

In the above-mentioned configuration, the light-shielding part may also be provided on a rear side of the package.

A liquid crystal display device provided with a liquid crystal panel unit arranged on the front side of the above-mentioned backlight unit can be an example of a device that uses the backlight unit of the above-mentioned configuration.

Effects of the Invention

According to the present invention, uneven brightness in planar light can be prevented from occurring in an edge-lit backlight unit. Furthermore, with the present invention it is possible to suppress uneven brightness in planar light and reduce energy consumption.

DETAILED DESCRIPTION OF EMBODIMENTS

Embodiments of the present invention will be explained below with reference to the drawings.

Figure 1:
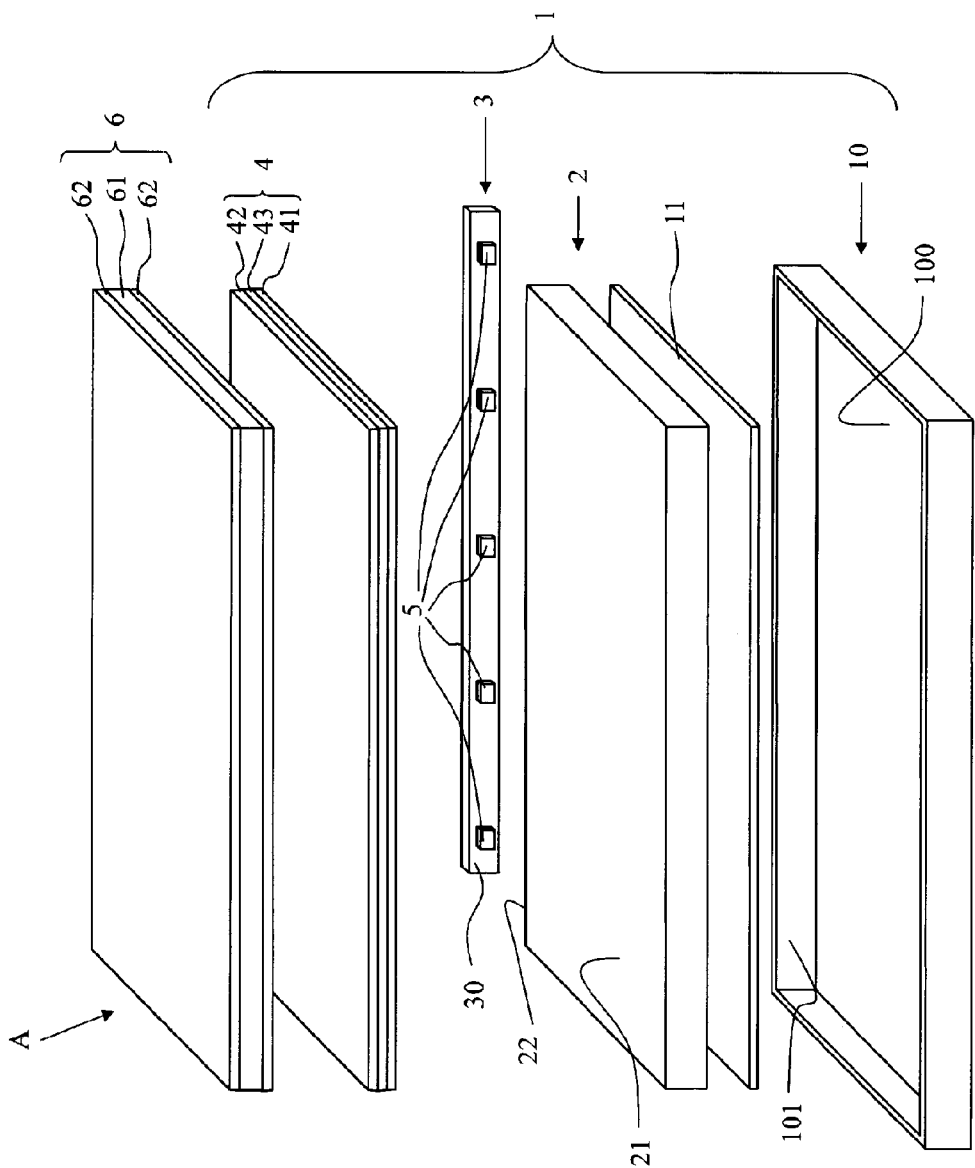
FIG. 1 is an exploded perspective view of one example of a liquid crystal display device provided with a backlight unit according to the present invention.

FIG. 1 is an exploded perspective view of one example of a liquid crystal display device including a backlight unit according to the present invention. In a backlight unit 1 shown in FIG. 1, the top of the page is the front surface, or in other words, the viewing side, and the bottom of the page is the rear surface. Hereinafter, unless noted otherwise, the present invention will be explained using the front surface and the rear surface in FIG. 1 as the standard.

As shown in FIG. 1, a liquid crystal display device A is provided with the backlight unit 1 and a liquid crystal panel unit 6 arranged on the front surface of the backlight unit 1.

The liquid crystal panel unit 6 has a liquid crystal panel 61 with liquid crystal sealed therein, and polarizing plates 62 respectively bonded to the front surface (viewing side) and rear surface (backlight unit 1 side) of the liquid crystal panel 61. The liquid crystal panel 61 includes an array substrate, an opposite substrate arranged facing the array substrate, and liquid crystal filled between the array substrate and opposite substrate.

Provided on the array substrate are: mutually intersecting source wiring lines and gate wiring lines; switching elements (thin-film transistors, for example) that are each connected to the respective source wiring lines and gate wiring lines; pixel electrodes that are each connected to the respective switching elements; an alignment film; and the like. Provided on the opposite substrate are: color filters in which respective colored parts of red, green, and blue (RGB) are arranged in prescribed arrays; a common electrode; an alignment film; and the like.

Driving signals drive the switching elements of the array substrate to apply a voltage between the array substrate and opposite substrate for each pixel of the liquid crystal panel 61. The voltage between the array substrate and opposite substrate changes to adjust the degree of light transmittance of each pixel. This causes images to be displayed on the image display region on the viewing side of the liquid crystal panel 61.

Embodiment 1

Figure 2:
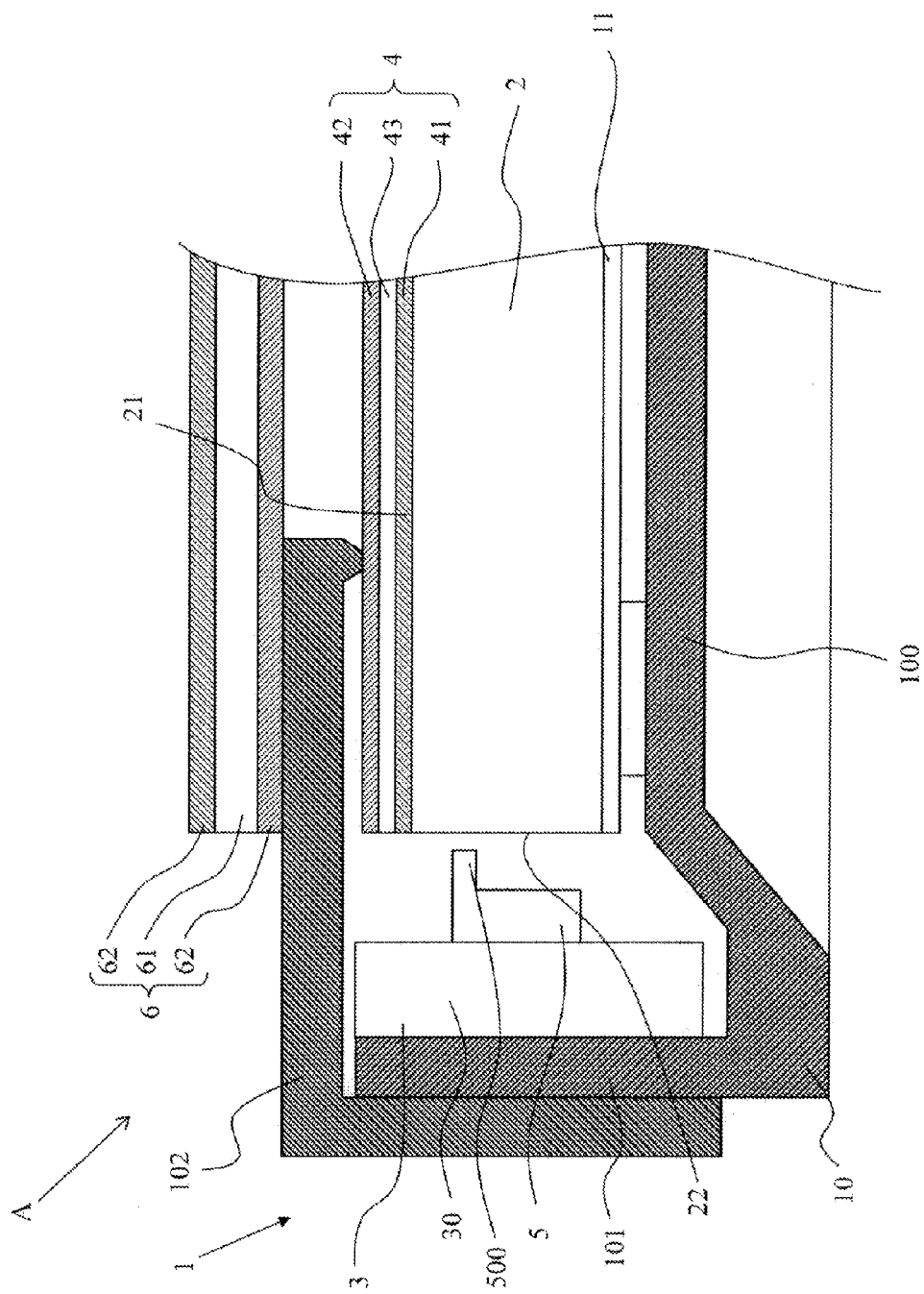
FIG. 2 is a cross-sectional view of the backlight unit included in the liquid crystal display device shown in FIG. 1.

Next, specific details of a backlight unit according to the present invention will be explained with reference to the drawings. FIG. 2 is a cross-sectional view of a liquid crystal display device shown in FIG. 1. A backlight unit 1 is an illumination device that emits planar light. As shown in FIG. 1, the backlight unit 1 is provided with a flat plate-shaped light guide plate 2, a light source unit 3 that emits light towards the light receiving face 22 formed on a side face of the light guide plate 2, and optical sheets 4 arranged adjacent to the light guide plate 2. The backlight unit 1 is also provided with a backlight chassis 10 in which at least the light guide plate 2, light source unit 3, and optical sheets 4 are arranged.

As shown in FIGS. 1 and 2, the backlight chassis 10 is a box member that is open in front (liquid crystal panel unit 6 side) and is provided with a bottom 100 that is rectangular in a plan view, and a side wall 101 that protrudes from four sides of the bottom 100. As shown in FIG. 1, the backlight unit 1 has a reflective sheet 11, the light guide plate 2, and the optical sheets 4 arranged therein, in that order from the bottom 100. As shown in FIG. 1, the light source unit 3 is installed on an inner peripheral side of the side wall 101. A front surface case 102 that is arranged so as to cover the front surface of the backlight chassis 10 and that presses edge parts of the optical sheets 4 is also provided (see FIG. 2).

The light guide plate 2 is made of a transparent resin such as polymethyl methacrylate (PMMA) or polycarbonate formed into a flat plate shape. The light guide plate is not limited to these resins, and a wide range of transparent resins that can be formed into a flat plate shape can be used.

As shown in FIG. 1, the light guide plate 2 is a flat plate member that is rectangular in a plan view. The main surface on the front side of the light guide plate is configured as a light exiting surface 21. One of the two side faces of the light guide plate in the long direction is configured as the light receiving face 22 that receives light from the light source unit 3. In the present embodiment, one of the four side faces of the light guide plate acts as the light receiving face 22, but without being limited thereto, two or more of the side faces may act as light receiving faces.

The light source unit 3 is provided with a plurality of LED modules 5 arrayed in a line. In the light source unit 3, the LED modules 5 are arrayed with equal gaps therebetween, but the array may have different gaps in some portions. The LED modules 5 are arranged such that emitted light is incident on the light receiving face 22. A detailed explanation of the light source unit 3 will be given later.

For optical sheet members, the optical sheets 4 are provided with diffusion sheet members 41 and 42 that diffuse light emitted from the light exiting surface 21 of the light guide plate 2, and a prism sheet member 43 that adjusts the direction of the light that exits from the light exiting surface 21, or, in other words, that changes the direction of light that enters at a slant such that the light goes towards the front. Optical sheet members having optical characteristics other than these may be used.

In the liquid crystal display device A shown in FIG. 1, the prism sheet member 43 is sandwiched between the two diffusion sheet members 41 and 42, but the configuration is not limited thereto. The diffusion sheet members 41 and 42 and the prism sheet member 43 have a shape and size that covers the light exiting surface 21.

The light emitted from the LED modules 5 enters from the light receiving face 22 of the light guide plate 2. The light that enters from the light receiving face 22, after being repeatedly reflected inside the light guide plate 2, ultimately exits from the light exiting surface 21 as planar light. It is preferable for all of the light that enters from the light receiving face 22 to exit from the light exiting surface 21. However, in practice, there is light that will exit from the main surface that is opposite to the light exiting surface 21. The reflective sheet 11 for reflecting light that exits from the surface that is opposite to the light exiting surface 21 and returning this light to the light guide plate 2 is arranged between the bottom 100 of the backlight chassis 10 and the light guide plate 2.

The light source unit 3 provided in the backlight unit 1 of the present invention will be explained in detail. The light source unit 3 has an elongated substrate 30 and 5 LED modules 5 mounted on top of the substrate 30 in parallel and with equal gaps therebetween. Wiring circuits (not shown) that respectively supply power to each of the 5 LED modules 5 are formed on the top of the substrate 30. These wiring circuits may supply a common amount of power to each LED module 5, or may supply a different amount of power to each LED module 5.

The light source unit 3 is fixed to the side wall 101 that protrudes from the long side of the bottom 100 of the backlight chassis 10 such that the LED modules 5 face the inner side of the backlight unit 1, namely the light receiving face 22 of the light guide plate 2. Therefore, the substrate 30 is a rectangular plate member with substantially the same size and shape as the side wall 101 to which the substrate 30 is attached.

The LED modules 5 are arrayed on a surface of the substrate 30 that faces the light receiving face 22 of the light guide plate 2 when the substrate 30 is attached to the side wall 101. This causes the light emitted from each LED module 5 to enter from the light receiving face 22 of the light guide plate 2. In order for light emitted from the LED modules 5 to efficiently enter the light receiving face 22, the gap between the LED modules 5 and the light receiving face 22 of the light guide plate 2 must be as small as possible, and preferably with no gap, if possible.

The light guide plate 2 will expand, however, due to heat from the light source unit 3 and a control substrate (not shown). Expansion of the light guide plate 2 causes the light guide plate 2 and LED modules 5 to make contact, exerting pressure on the LED modules 5 by the light guide plate 2. This pressure may damage or destroy the LED modules 5 and (or) the light guide plate 2. Damage or destruction of the LED modules 5 and (or) the light guide plate 2 will cause uneven brightness in the planar light emitted from the backlight unit 1. In the backlight unit 1, the LED modules 5 and light guide plate 2 are arranged with enough of a gap therebetween to not be in contact even if the light guide plate 2 expands.

Figure 3:
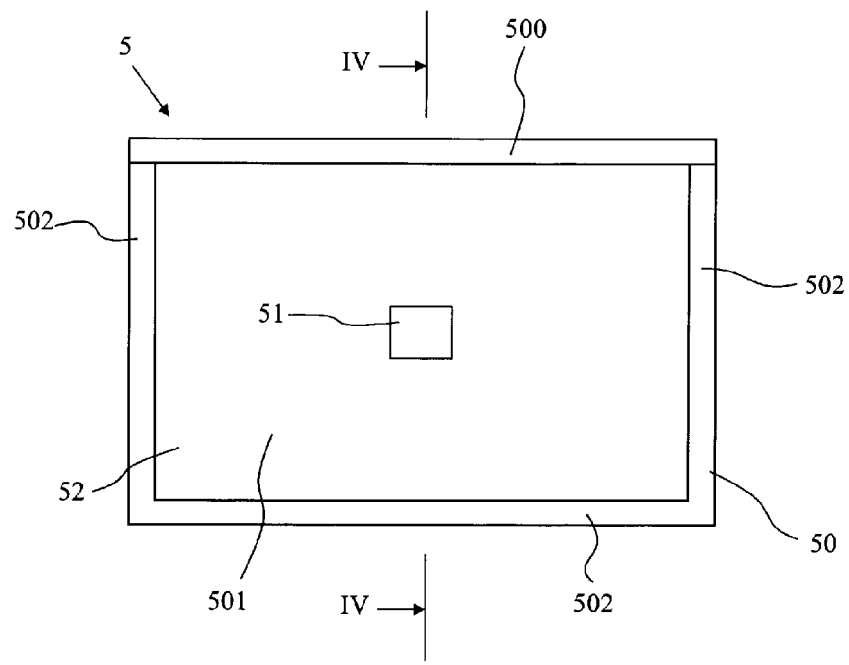
FIG. 3 is a front view of an LED module used in the backlight unit of the present invention.
Figure 4:
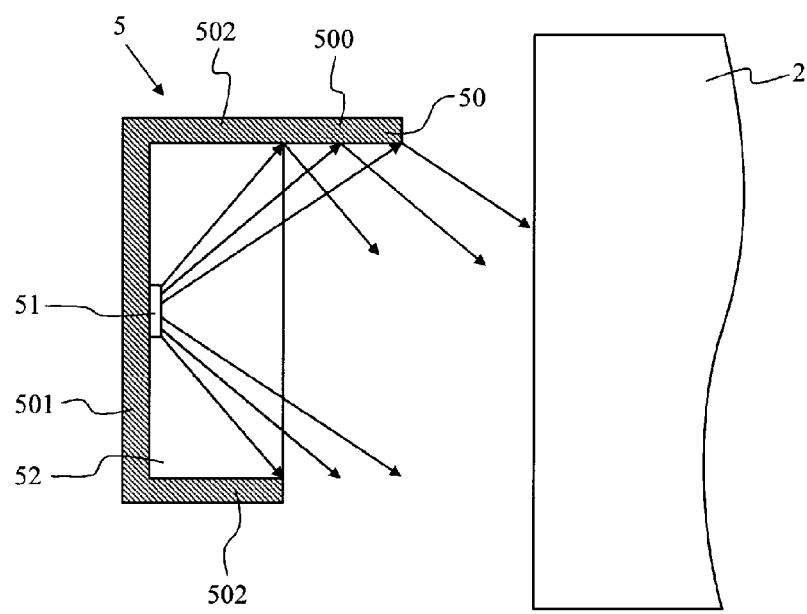
FIG. 4 is a cross-sectional view of the LED module shown in FIG. 3 cut along the line IV-IV.

Next, specific details of the LED modules 5 will be explained with reference to the drawings. FIG. 3 is a front view of the LED module used in the backlight unit of the present invention, and FIG. 4 is a cross-sectional view of the LED module shown in FIG. 3 cut along the line IV-IV. As shown in FIGS. 3 and 4, each of the LED modules 5 is provided with a package 50 that is an integrally molded body of resin, an LED chip 51 arranged inside the package 50, and a sealing part 52 that seals the LED chip 51.

An example of the LED chip 51 can include a configuration provided with a light emitting element that emits light of every color wavelength of red (R), green (G), and blue (B) to emit a white light. The following can be adopted for such a configuration: a pseudo-white type that emits white light by combining the LED chip 51 that emits blue (B) wavelength light with the sealing part 52 provided with a portion that emits yellow light when the blue (B) wavelength light is incident on at least a portion of the sealing part 52 and by mixing the blue (B) and yellow wavelengths of light; a high color rending type that emits white light by combining the LED chip 51 that emits blue (B) wavelength light with the sealing part 52 provided with a portion that emits red (R) and green (G) light when the blue (B) wavelength light is incident on at least a part of the sealing part 52 and by mixing the blue (B), red (R), and green (G) wavelengths of light; or the like.

As shown in FIGS. 3 and 4, the package 50 has a box shape that is open on one side surface and is provided with a bottom 501 that is rectangular in a front view, and side walls 502 that protrude from the long sides and short side thereof. A light-shielding part 500 that extends from a tip of one of the side walls is formed on a tip section of one of the side walls 502 that protrudes from the long side of the bottom 501.

The inner surface of the bottom 501, side walls 502, and the light-shielding part 500 of the package 50 are configured to reflect light from the LED chip 51 with ease. This configuration that easily reflects light may be a configuration in which the package 50 is made of a white resin, a configuration in which white printing or the like is performed on regions to be irradiated with light from the LED chip 51, or a configuration made of a metal film, for example. A wide range of configurations can be used in which the light emitted from the LED chip 51 is reflected. The light-shielding part 500 may suppress light from the LED chip 51 from passing through, or may be configured such that a portion or all of the emitted light is absorbed (such as a configuration with a coating that absorbs light, for example).

As described above, the bottom 501 of the package 50 is rectangular, and the LED chip 51 is attached to the center of the surface near the opening. A recessed portion surrounded by the bottom 501 and side walls 502 is sealed by the sealing part 52 in a state in which the LED chip 51 is mounted on the bottom 501. The sealing part 52 is a transparent resin and is filled into the package 50 and hardened. Forming the sealing part 52 suppresses foreign matter such as moisture, dust, and dirt from attaching to the LED chip 51 and suppresses deterioration of the LED chip 51. The sealing part 52 is formed from the bottom 501 to the top of the side walls 502.

The light emitted from the LED chip 51 has strong directionality, but due to the LED chip 51 being a point light source, the light emitted from the LED chip 51 is diffused light. In the LED module 5, diffused light having a strong directionality in the axis direction that is perpendicular to the bottom is emitted from the LED chip 51 arranged on the bottom 501.

The light emitted from the LED chip 51 expands outside the package 50 when the light goes further than the side walls 502 of the package 50. At this time, of the light emitted from the LED chip 51, the light that has reached the light-shielding part 500 is reflected by the light-shielding part 500 (see FIG. 4). Therefore, the light emitted from the LED module 5 is not diffused into the side where the light-shielding part 500 is formed, but rather is diffused and emitted in another direction.

The LED module 5 is mounted such that the light-shielding part 500 is arranged on one long side of the substrate 30. In this way, the light source unit 3 is formed. The substrate 30 is attached to the side wall 101 of the backlight chassis 10 such that the light-shielding parts 500 of the LED modules 5 are arranged on the front side of the backlight unit 1. As shown in FIG. 2, when the light source unit 3 is attached to the backlight chassis 10, the light that is diffused towards the front side, of the light emitted from the LED modules 5, is reflected towards the rear side by the light-shielding part 500.

This makes it possible to suppress light emitted from the LED modules 5 leaking from the gap between the light source unit 3 and light receiving face 22 of the light guide plate 2 (light leakage). Thus, uneven brightness in the planar light caused by light leakage can be suppressed.

The light emitted from the LED chip 51 and reflected by the light-shielding part 500 is incident on the light receiving face 22 of the light guide plate 2, and thus, it is possible to use the leaked light as a portion of the planar light. This enables light emitted from the LED chip 51 to not be wasted, and therefore, the power consumption of the backlight unit 1 can be reduced.

Embodiment 2

Figure 5:
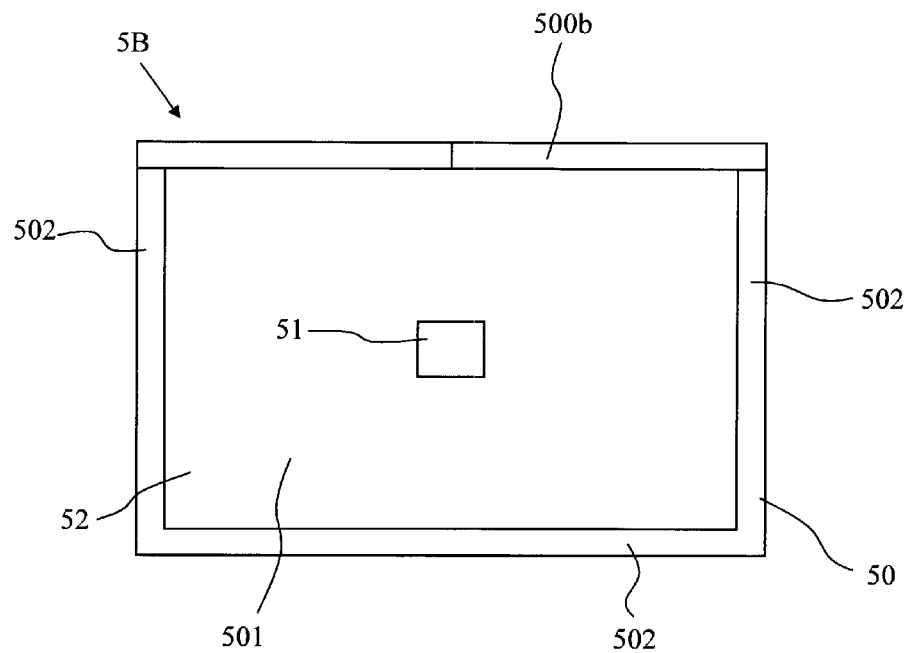
FIG. 5 is a front view of another example of an LED module used in the backlight unit of the present invention.
Figure 6:
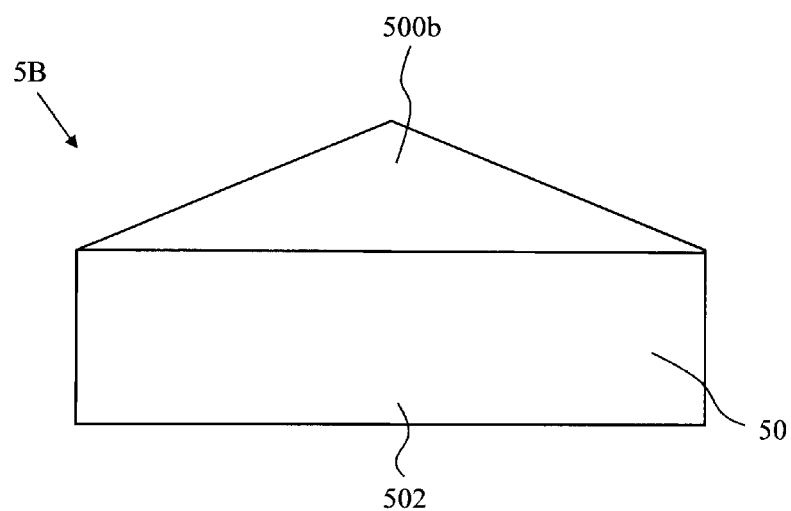
FIG. 6 is a bottom view of the LED module shown in FIG. 5.

Another example of a backlight unit according to the present invention will be explained with reference to the drawings. FIG. 5 is a front view of another example of an LED module used in the backlight unit of the present invention, and FIG. 6 is a bottom view of the LED module shown in FIG. 5. An LED module 5B shown in FIGS. 5 and 6 has the same configuration as the LED module 5 shown in FIGS. 3 and 4 except that the shape of a light-shielding part 500b is different, and thus, the same reference characters will be used for parts that are essentially the same.

As described above, an LED chip 51 is a point light source that emits diffused light, and thus, in the LED module 5B, the light that is incident on the light-shielding part 500b is stronger (the amount leaked is greater) in the vicinity of the central portion of the long direction than both ends of the long direction. As shown in FIGS. 5 and 6, in the LED module 5B, the shape of the light-shielding part 500b is a triangular shape in which the central portion of the long direction protrudes out, thereby making it possible to efficiently reflect light that is incident on the light-shielding part 500b of the light emitted from the LED chip 51.

By using a light source unit 3 in which the LED module 5B is arranged on a substrate 30 such that the light-shielding part 500b acts as the front side, it is possible to suppress light leaking towards the front side of a backlight unit 1 from between the LED chip 51 and a light receiving face 22 of a light guide plate 2. The shape of the light-shielding part 500b is also triangular, and thus, it is possible to secure a gap between the light-shielding part 500b and the light receiving face 22, thereby making it harder to block the flow of air, and increasing heat dissipation characteristics.

A triangular shape is shown as an example for the shape of the light-shielding part 500b, but without being limited thereto, the light-shielding part 500b may be a polygonal shape (a trapezoid or the like, for example) that juts out from the central portion thereof, or the light-shielding part 500b may be a semi-elliptical shape or the like cut along a semicircle or long axis. The light emitted from the LED chip 51 becomes weaker the farther it goes. A boundary may be used as the tip shape of the light-shielding part 500b strong enough that the light from the LED chip 51 does not form a bright line. It is possible to use a wide range of shapes that can effectively reflect light emitted to the light-shielding part 500b side, of the light emitted from the LED chip 51.

Embodiment 3

Figure 7:
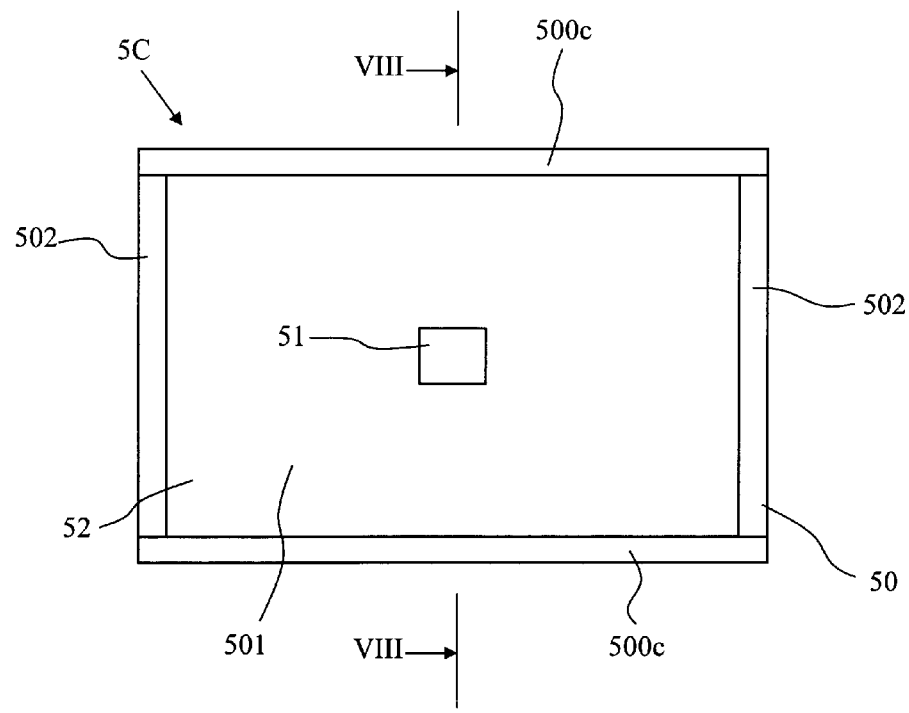
FIG. 7 is a front view of another example of an LED module used in the backlight unit of the present invention.
Figure 8:
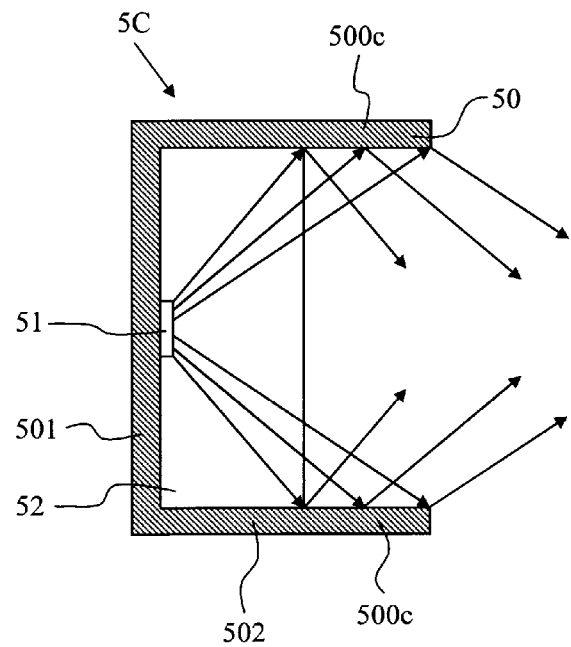
FIG. 8 is a cross-sectional view of the LED module shown in FIG. 7 cut along the line VIII-VIII.

Another example of a backlight unit according to the present invention will be explained with reference to the drawings. FIG. 7 is a front view of another example of an LED module used in the backlight unit of the present invention, and FIG. 8 is a cross-sectional view of the LED module shown in FIG. 7 cut along the line VIII-VIII. An LED module 5C shown in FIGS. 7 and 8 has the same configuration as the LED module 5 shown in FIGS. 3 and 4 except that the shape of a light-shielding part 500c is different, and thus, the same reference characters will be used for parts that are essentially the same.

As shown in FIGS. 7 and 8, the LED module 5C has the light-shielding part 500c formed on both tips of side walls 502 that protrude from long sides of a bottom 501. As such, there are two light-shielding parts 500c, the light-shielding parts 500c thereby reflecting light that is incident in the short direction, of the light emitted from an LED chip 51. This makes it possible to suppress light from leaking in the short direction of the LED module 5C.

The side walls 502 of both long direction ends of the LED module 5C are not provided with the light-shielding part 500c, and thus, light that is emitted from the LED chip 51 to the long directions of the LED module 5C is diffused.

By using this LED module 5C with a light source unit 3 that is arranged on a substrate 30 such that one of the light-shielding parts 500c acts as the front side, it is possible to suppress light leaking towards the front side and rear side of a backlight unit 1 from between the LED chip 51 and a light receiving face 22 of a light guide plate 2. The light that is diffused in the long direction of the LED module 5C is not regulated, and thus, uneven brightness in the planar light emitted from the light guide plate 2 can be suppressed.

The light-shielding part 500c is rectangular in a plan view, but without being limited thereto, at least one of the light-shielding parts 500c may have the central portion thereof protruding, as shown in FIGS. 5 and 6. In the present embodiment, a configuration of the light-shielding part 500c in which the light-shielding parts 500c are formed on the side walls 502 protruding from the long sides of the bottom 501 is described as an example, but without being limited thereto, the light-shielding part 500c may be formed on the side walls 502 protruding from short sides of the bottom 501.

Embodiments of the present invention were described above, but the present invention is not limited to the above embodiments. The present invention can have various modifications without departing from the spirit thereof.

INDUSTRIAL APPLICABILITY

The backlight unit and liquid crystal display device according to the present invention can be used as a display part for electronic devices such as information appliances, notebook PCs, mobile phones, and gaming devices.

DESCRIPTION OF REFERENCE CHARACTERS 1 backlight unit
2 light guide plate
21 light exiting surface
22 light receiving face
3 light source unit
30 substrate
4 optical sheets
41, 42 diffusion sheet member
43 prism sheet member
5 LED module
50 package
500 light-shielding part
501 bottom
502 side wall
51 LED chip
52 sealing part
6 liquid crystal panel unit

The invention claimed is:

1. A backlight unit, comprising:
a light source unit having a plurality of light emitting diode modules arranged in a row; and
a light guide plate that has a light receiving face that is a side face where light from the light source unit enters, and that emits a planar light from a light exiting surface that is a main surface so as to emit the planar light from a front side of the backlight unit,
wherein each of the light emitting diode modules is provided with a light-shielding part on a package that surrounds a light emitting diode chip, which is a light source, the light-shielding part being on at least the front side of the backlight unit, the light-shielding part protruding towards the light receiving face of the light guide plate,
wherein a sealing part that seals the light emitting diode chip with a resin is formed in the package, and
wherein a tip of the light-shielding part is closer to the light guide plate than the sealing part.

2. The backlight unit according to claim 1,
wherein a surface of the light-shielding part near the light emitting diode chip reflects light.

3. The backlight unit according to claim 1,
wherein the light-shielding part has a shape in which a central portion of the light-shielding part is closest to the light guide plate.

4. The backlight unit according to claim 3,
wherein the light-shielding part has a triangular shape.

5. The backlight unit according to claim 1,
wherein the light-shielding part is also provided on the package on a rear side.

6. A liquid crystal display device, comprising:
the backlight unit according to claim 1; and
a liquid crystal panel unit arranged on the front side of the backlight unit.

7. A backlight unit, comprising:
a light source unit having a plurality of light emitting diode modules arranged in a row; and
a light guide plate that has a light receiving face that is a side face where light from the light source unit enters, and that emits a planar light from a light exiting surface that is a main surface so as to emit the planar light from a front side of the backlight unit,
wherein each of the light emitting diode modules is provided with a light-shielding part on a package that surrounds a light emitting diode chip, which is a light source, the light-shielding part being on at least the front side of the backlight unit, the light-shielding part protruding towards the light receiving face of the light guide plate,
wherein the light-shielding part has a shape in which a central portion of the light-shielding part is closest to the light guide plate, and
wherein the light-shielding part has a triangular shape.

8. A liquid crystal display device, comprising:
the backlight unit according to claim 7; and
a liquid crystal panel unit arranged on the front side of the backlight unit.

* * * * *